Patented Sept. 28, 1937

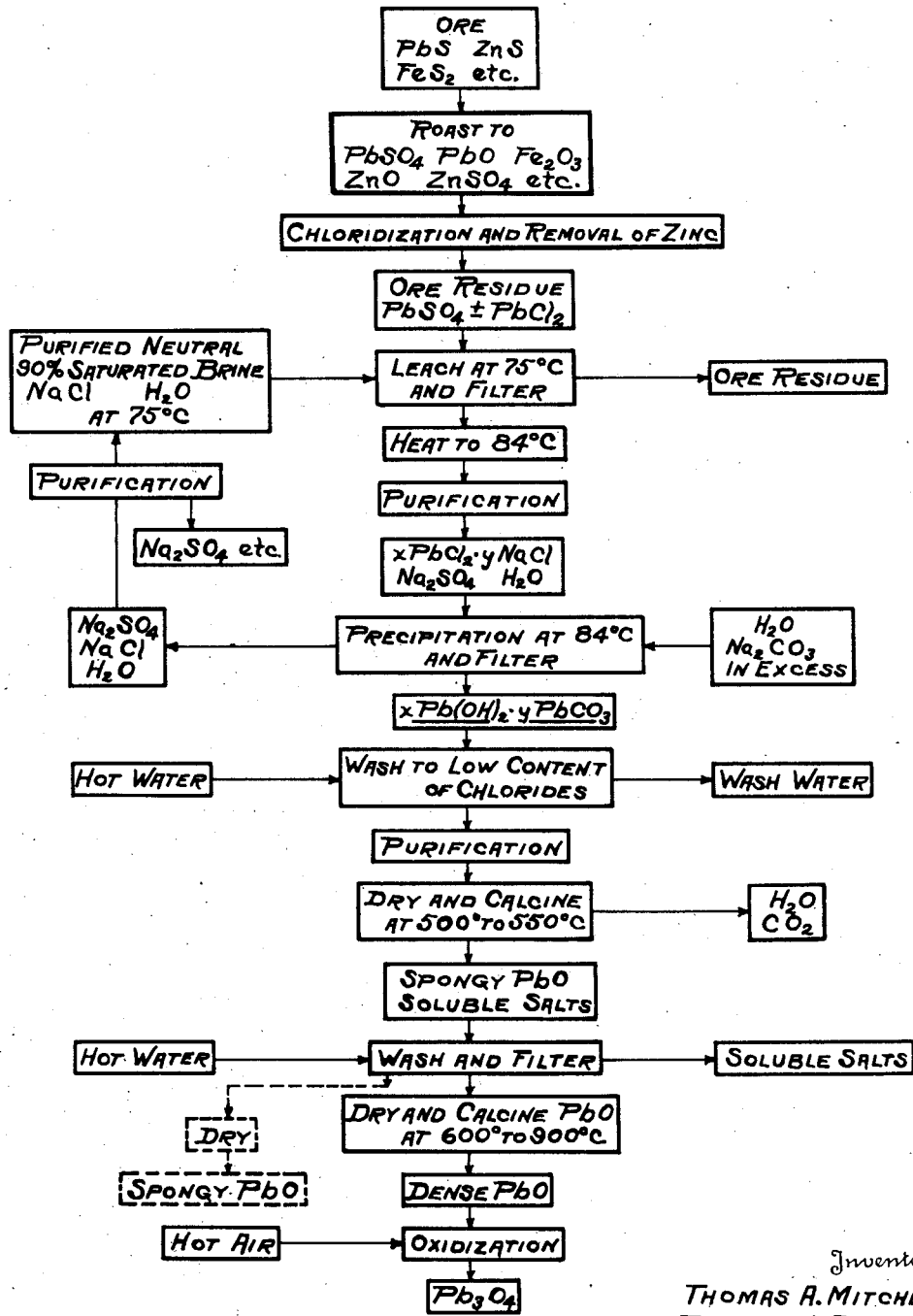

2,094,276

UNITED STATES PATENT OFFICE 2,094,276

METHOD OF MAKING LEAD OXIDE

Thomas A. Mitchell, Inglewood, and Robert J. Dalton, Torrance, Calif., assignors to Hughes-Mitchell Processes, Incorporated, Denver, Colo., a corporation of Wyoming Application February 23, 1935, Serial No. 7,706

8 Claims. (Cl. 23—146)

This invention relates to a method of making the lead oxides, and more particularly to the production of litharge and red lead of required chemical purity and physical characteristics from lead bearing ore materials.

Lead oxide is commonly made by oxidizing metallic lead which in turn has been derived from ores, such as those containing lead sulfide. Consequently, the process of making the oxide is expensive because of the necessity for going in a roundabout manner through the metallic lead stage. In accordance with the present invention, a lead bearing ore material, and particularly lead sulfide or a complex ore containing lead and zinc sulfides, is so treated that lead salts are obtained directly therefrom, and these in turn are converted to the required oxide, without requiring the ore to be smelted and converted to metallic lead as an intermediate product. In this process, a salt brine solution of lead sulfate and/or chloride is obtained from the ore material and this solution is then so treated that lead compounds are precipitated therefrom which may be calcined to lead oxide.

Various problems are, however, met in carrying on this general procedure; and it is accordingly one object of this invention to so treat a lead bearing ore, and particularly a simple or a complex sulfide ore or an ore residue containing lead sulfate and/or chloride, that the desired lead oxide may be obtained therefrom by an efficient and economical process.

It is a further object to so treat lead sulfate and/or chloride by a series of steps that lead oxide of required purity, composition and physical characteristics may be readily obtained, and particularly by the employment of such reagents and steps that the process may be cyclically carried on and the product purified without introducing undesired elements into the system. Further objects will be apparent in the following discussion of the problems which have been overcome in carrying out the process as herein described.

In order that this invention may be fully understood, reference is to be had to the accompanying drawing showing in a flow diagram the preferred series of steps involved in converting the lead sulfide of a complex lead and zinc sulfide ore to the desired lead oxides.

Lead may be obtained from many types of ores and lead bearing materials for use in this process, and these will be converted by various chemical procedures to lead sulfate and/or lead chloride. If, for example, the ore contains lead sulfide, it may be roasted under suitable conditions and in accordance with various methods to form lead sulfate. A sulfate roasting process may be used in which the sulfur oxygen gases evolved by oxidation of the sulfide sulfur of the ore are caused to react with the ore metal compounds and form oxides thereof. Also, the ore may be roasted under standard oxidizing conditions and the roasted product be thereafter treated to solubilize its values, such as by chloridizing the zinc content while forming either the chloride or the sulfate of lead. If a complex ore, such as one containing both lead and zinc sulfide, together with iron sulfide and various other compounds, is employed as the source of lead, this ore may, for example, be roasted under oxidizing conditions and at a low temperature, which may be as low as 550° C. for some ores, to form lead sulfate together with zinc oxide and/or sulfate. The temperature is held below that point at which the lead sulfate or other ore values will fuse or the ore mass form a sintered or vitreous condition, and suitable precautions are taken to insure that the roasted material is porous or permeable by liquids and gases. The iron may be oxidized to ferrous or ferric oxide depending upon the conditions of the process. For the lower oxide, the oxidizing roast may be followed by a reducing operation.

The zinc oxide and sulfate may be readily removed from this roasted material by various procedures, such as by dissolving the same in a dilute sulfuric acid, and the ore residue may be thereafter treated in accordance with suitable methods to remove other compounds which might detrimentally affect the required procedure of making lead oxide. It is desirable, for instance, that all of the water soluble zinc compounds be removed from the ore before the lead sulfate is leached therefrom by a hot salt brine solution. To this end, the ore residue may be subjected to a chloridizing treatment, in which various reagents may be used, such as ferric and/or ferrous chlorides, which serve as a source of nascent chlorine or hydrochloric acid or both. I prefer to employ the Mitchell process described in Patent No. 1,979,281, in accordance with which the residual zinc compounds are converted to zinc chloride and the iron is left as insoluble ferric oxide. Such lead oxide as may have been formed during the roasting operation may be converted to lead chloride and/or lead sulfate, so that lead oxide is substantially absent from the ore residue. Otherwise, it is desirable to so roast the ore that the minimum of lead oxide is formed. If lead oxide is present, lead hydroxychloride would be formed as a precipitate in the ore residue by interaction of the lead oxide and sodium chloride of the brine. Such other ore metals as silver and copper may be converted to the chlorides and ultimately separated from the lead by suitable methods and as herein described. The chloridized material may, therefore, be leached with cold water and the zinc chloride and other water soluble compounds may be removed therefrom, but leaving the lead chloride and lead sulfate in the insoluble ore residue. Various other methods may be employed for separating the undesired elements from the lead, provided the lead is left in the form of lead chloride and/or lead sulfate, but all of the water soluble zinc compounds should be removed so as to avoid contamination of the product with zinc oxide.

Having thus suitably prepared the ore material so that it contains lead sulfate and/or chloride, but is free from undesired water soluble compounds, the ore material is now leached or otherwise treated with a salt brine to dissolve the lead from the ore residue. For this purpose, a hot, neutral sodium or potassium chloride brine is employed. This brine should be of high concentration, and it is preferable to employ a sodium chloride brine which is from 85% to 95% saturated at the temperature of use. The preferred procedure is to place a given amount of finely divided ore material containing the lead sulfate and/or chloride in a large vat and to treat it therein with a definite amount of the hot sodium chloride brine which is in excess of that amount required to take the lead into solution. It is desirable to use the maximum temperature which is efficient for the leaching operation and so to get a high concentration of lead into solution in a small amount of brine. If for any reason salt should crystallize from solution, the temperature may be raised slightly to dissolve the crystals. It is to be understood that any suitable temperature may be employed but it is preferable that it be as high as 75° C., and if desired this may be raised to a much higher degree, such as 90° C. We prefer to work within this range of 75° to 90° C. The leaching brine is circulated through the ore material until a desired amount of lead has been removed therefrom and the solution has a required concentration, and preferably is substantially saturated with lead under the temperature conditions of the process. The solution of lead in the salt brine is presumed to represent a compound of the formula $xPbCl_2 \cdot yNaCl$.

The brine should be neutral in its reaction. If it is acidic, it may dissolve iron from the ore residue; if alkaline, it may precipitate a lead compound. It should, of course, be free from objectionable impurities. To this end, the brine which is used cyclically should be purified periodically to remove therefrom the undesired elements. Also, sodium sulfate will be formed if lead sulfate has been dissolved from the ore, or it may be derived from trona if the latter is used in the process. The solubility of the lead will change with the amount of sulfate ions present; hence it is desirable that the salt brine employed for leaching the ore does not contain a high concentration of such ions, although it is suitable to use a brine containing a low content thereof. In the preferred procedure, as the sodium sulfate accumulates in the brine, it is periodically removed so that the brine may be returned for leaching further lead values from the ore. This may be suitably accomplished by heating and evaporating the brine until sodium sulfate crystallizes therefrom and may be thus readily removed.

After removing the leached solution from the ore residue, the temperature should be raised so that the solution will be unsaturated with respect to both the sodium and lead ions. This obviates difficulties during the filtering operation, in which the sodium-lead chloride might crystallize out due to a slight lowering of temperature. If the ore has been leached at 75° C. or below 84° C., it may then be raised to about 84° C. to obtain a clear solution which may be readily treated in the subsequent purification and precipitation stages. Until the lead has been precipitated from its solution, this temperature is, therefore, held substantially constant, and preferably at about 84° C. If the ore has been leached by a brine held at a temperature higher than 75° C., then the lead bearing brine is heated still higher to a substantial extent which is sufficient to prevent detrimental crystallization. In the following explanation of the process, the two temperatures will be assumed to be 75° C. and 84° C. respectively.

This solution may contain various amounts of impurities, such as the chlorides of iron, manganese, bismuth, arsenic, antimony, copper, cadmium, silver and gold, of which iron, manganese and copper may be present in the greatest amounts. It is, therefore, desirable that the solution be purified at this stage, and this purification may be effected in any suitable manner, as is known by those skilled in the art. For example, iron may be precipitated by means of a suitable oxidizing agent to oxidize any ferrous iron to the ferric condition, so that it may then be thrown down as ferric hydroxide by means of a base added for the purpose. If potassium permanganate and sodium or potassium carbonate are employed, manganese is precipitated as manganese dioxide and iron as ferric hydroxide. Likewise, other impurities which are present may be removed by the use of reagents which will precipitate them as insoluble compounds and leave the lead in solution. It is preferable to employ those reagents which do not leave new or undesired ions in the solution of the sodium and/or potassium chloride which is employed for the brine. Sodium and potassium may be considered to be the same elements for the purposes of this process, since the addition of a small amount of potassium to a sodium chloride brine is not objectionable. For instance, one may employ sodium hypochlorite and sodium carbonate or caustic soda as the oxidizing and precipitating agents, or one may use chlorine dissolved in a weak caustic soda solution, which serve in the presence of the lead-sodium chloride solution to oxidize ferrous chloride and thus to precipitate the iron chloride as the insoluble ferric hydroxide. Manganese is also precipitated by these reagents. After filtering off the iron and manganese precipitates, the solution may then be treated to remove further undesired elements, such as by means of sodium sulfide added in a slight excess of the amount needed to throw down the copper, silver and cadmium as sulfides, which will precipitate before the sulfide of lead is formed. These sulfides may then be filtered from the solution. By using the sodium salts at this stage, no new ions will thus be added to a sodium chloride brine, and any excess of sulfide ions will come down as lead sulfide and thus be removed from the solution. Having thus purified the solution of undesired elements, the solution, while held at approximately 84° C., is now ready for precipitating lead carbonate therefrom.

The precipitation of lead carbonate is preferably accomplished by means of alkali metal carbonates, and preferably by a carbonate of the same alkali metal as is found in the brine, such as sodium or potassium carbonate. Various sources of the raw carbonate material are available, and one may use either natural or artificial products of required composition and whether in solution or as a dry material. The carbonate reagents may also contain harmless ions, such as chlorine, sulfate, etc., and particularly since sulfate and chlorine ions are present in the lead salt solution.

This process is particularly suited for using natural salt deposits or brines derived therefrom, which are herein termed "trona" although of many different compositions depending upon the source of the natural material. These trona deposits, such as are found at Owens Lake, California and in other soda lakes or deposits in different parts of the world, are made up of a complex mixture of salts, and chiefly the chloride, the sulfate and the carbonates of sodium. In this process, the sulfate content will be largely crystallized out at any desired stage by evaporation, and such sulfate ions as remain will not be harmful. On the other hand, the carbonate ions will serve directly in the precipitation of lead carbonate and the chlorine ions remaining in the brine will then be useful for leaching the lead sulfate and chloride from the ore material. Any hydroxyl ions present will also serve in the process. Thus, trona serves as a single source of the primary reagents used in the process and the economic advantages of this will be readily apparent. If desired, the complex brine may be suitably treated for removing elements that are not desired in the process. Also, its composition may be suitably modified by the addition of other salts thereto, so as to render the process efficient. It is particularly to be noted that the chloride content will increase as the brine is cyclically used, and so the trona will serve to provide all of the chlorine needed, although there is only a low percentage in the natural brine or salt deposit. The term "alkali metal carbonate" as used in the claims is, therefore, to be interpreted as covering such materials as trona or other mixtures of different salts containing alkali metal carbonate which are applicable to the process.

This precipitation step is preferably accomplished by adding to the strong lead solution a strong aqueous solution of the trona or sodium carbonate, such as 20° Bé., and preferably slightly in excess of the stoichiometric amount required to precipitate all of the lead from solution. During this precipitating step, the mass may be agitated violently and the reagent added at a desired rate to secure a suitable product. Owing to the hydrolysis of the sodium carbonate solution, or to the nature of the salt mixture used, there are hydroxyl ions present, with the resultant precipitation of lead hydrate or a basic carbonate. The compound thus formed is presumed to be lead hydroxycarbonate of the variable formula $xPb(OH)_2.yPbCO_3$, but it is herein termed lead carbonate. It is immaterial as to what are the relative proportions of these parts or chemical nature of the precipitate, since the subsequent steps of the process are intended for the formation of lead oxide. If desired, precautions may be taken to insure the formation of a compound of a definite formula, so that the lead carbonate thus obtained may be removed and used as desired. If, however, the object of the invention is to obtain lead oxide, then the following steps are preferably employed.

It is found that in this process there is a tendency for undesired sodium and lead compounds, and particularly a double salt of sodium and lead chlorides, and other compounds to appear in the lead hydroxycarbonate and which are not readily removed therefrom by standard washing operations. Hence, the final product will be contaminated therewith unless special precautions are taken, as is one object of this invention. This problem arises largely from the fact that strong or highly concentrated solutions of the reagents are employed, so that the precipitation takes place so rapidly that some of the reagent solutions or the double salt of sodium and lead chloride are occluded on and within large masses of the particles and are thus held within the agglomerated mass of precipitate. Hence, excess alkalinity at first and violent agitation of the solution during and after precipitation are desirable to break up these large masses in so far as possible. After precipitation has been completed, the brine is just distinctly alkaline to phenolphthalein.

In accordance with this invention, it is possible to solubilize the occluded or entrapped reagent impurities by means of a calcining operation which breaks down the double salts and leaves the undesired elements in water soluble compounds. This calcination is also employed to remove the carbonate and hydrate content of the lead carbonate and form lead oxide thereof without fusing the same. Thereafter, the impurities may be readily dissolved from the product and the latter will be in suitable purified condition for the subsequent steps. To this end, the lead hydroxycarbonate is removed from its salt brine, such as by decantation, and the brine is then ready for further purification and concentration steps and re-use in the process. The precipitate may now be washed with water to remove the major portion of the salt brine, but no effort is made to wash the material thoroughly. It is satisfactory if the chloride content of the precipitate is reduced to 0.15%, but a larger content may be left if desired. Then, the precipitate, after this preliminary washing operation, is removed from the water and dried and calcined. This calcination is carried on preferably in a direct fired rotary calciner and in a neutral or oxidizing atmosphere so as to drive off the water and carbon dioxide gas and form a porous or spongy lead oxide, and preferably litharge. For this purpose, the temperature is held only sufficiently high to decompose the hydrate and carbonate or basic carbonate, such as a temperature of about 500° to 550° C., which will not fuse the material but will prevent the formation of $Pb_3O_4$. However, red lead may be formed at this stage, if desired, by holding the temperature below its decomposition point and providing sufficient oxygen for the purpose of oxidizing the litharge that is formed. This calcination serves to break into its separate chlorides the complex sodium-lead chloride, as well as to convert into water-soluble compounds various other substances which may be present. It also serves to expose the water-soluble compounds which have been occluded on the lead because the removal of $CO_2$ and OH leaves the mass in a spongy condition and the temperature is too low for fusion.

Hence, a second washing operation will now serve to dissolve these water soluble compounds, such as sodium plumbate, hydroxide and chloride, and thus remove them from the litharge. For this washing operation, the spongy litharge particles are repulped in water which has been heated sufficiently to dissolve any lead chloride that may be present. This operation thus serves to dissolve the alkali and the water soluble lead salts and to leave the litharge free therefrom. This step will reduce the chloride content to a desired extent and less than 0.001%.

The litharge as thus made may be dried and used in its spongy form. If desired, it may be again calcined to produce litharge of the density and other physical characteristics required for various uses, such as a battery material. To this end, the spongy litharge is calcined in a direct fired rotary calciner at a temperature of from 600° to 900° C., depending upon the particular density and other physical characteristics required. This calcination is for the purpose of removing that water of hydration which has been picked up by the material during the previous washing operation, as well as to change the physical nature of the particles. The firing is carried on in a neutral or oxidizing atmosphere, the same as the previous calcining step, it being evident that one should not use a reducing atmosphere which would tend to form metallic lead. Above 883° C., the litharge will melt, and the temperature and heating conditions may be so regulated as to remove the water and to fuse the lead oxide to a desired extent and form particles of required density. If the litharge is melted completely, it will solidify to a dense crystalline condition.

If it is required to produce red lead or lead oxide of the formula $Pb_3O_4$, the spongy lead, after the soluble salts have been dissolved therefrom, or the litharge resulting from the second calcining operation, may be calcined with excess air to oxidize it to the higher form. This is preferably accomplished in a muffled furnace comprising, for example, a rotating steel shell which is heated externally by hot furnace gases passing around the shell. Hot air is introduced into the interior of the muffle chamber and a suitable temperature below 500° C. maintained, the air flow and temperature being so regulated that the litharge is readily oxidized to $Pb_3O_4$. The air introduced into the muffle chamber may be heated by passing it through a pipe externally heated by the hot furnace gases. This procedure gives a high oxygen concentration and serves efficiently for the oxidizing process.

It will now be appreciated that this process involves a simple but economical and efficient method of forming the various lead oxides, and particularly litharge and red lead, from a salt brine solution of lead sulfate and/or chloride, and yet provides a final product which is substantially free from chlorine as well as sulfate and has a required physical structure. The procedure is cyclic with regard to the brine solution, because no new and undesirable ions are introduced therein and the primary reagents may be economically derived from trona or other single source of raw materials.

It will also be understood that a solution of lead chloride in hot water may be treated in accordance with the broad principles of this invention and with such modifications in the process as will be apparent, in view of the above disclosure, to one skilled in the art. The initial lead chloride solution may be obtained from any suitable source; or lead chloride crystals may be added to a solution of sodium carbonate, or other bath containing the same, for the initial precipitation of the lead carbonate. Various other modifications in the process will now be readily apparent.

Having thus described the invention, what is claimed as new and desired to secure by Letters Patent is:

1. The method of making lead oxide comprising the steps of treating a hot, concentrated, aqueous, lead sodium chloride solution with alkali metal carbonate to precipitate lead carbonate, separating the precipitate from the solution, calcining the precipitate in a non-reducing atmosphere at a temperature below 883° C. but above the decomposition points of the lead carbonate and the lead sodium chloride reagent, and thereby converting the mass into a spongy unmelted lead oxide containing the reagent impurities as water soluble lead and sodium chlorides, and thereafter washing the product thoroughly with water to remove said water soluble impurities therefrom.

2. The method of making litharge comprising the steps of treating a hot, concentrated, aqueous, lead sodium chloride solution with alkali metal carbonate to precipitate lead carbonate, separating the precipitate from the solution, washing the precipitate to remove a portion of the reagent impurities, calcining the precipitate in a non-reducing atmosphere at a temperature below 883° C. but above the decomposition points of the lead carbonate and the lead sodium chloride reagent, and thereby converting the mass into a spongy unmelted lead oxide containing the reagent impurities as water soluble lead and sodium chlorides, thereafter washing the product thoroughly with water to remove said water soluble impurities therefrom and again calcining the mass in a non-reducing atmosphere at a temperature between 600° C. and 900° C. to remove all water of hydration and form dense litharge.

3. The method of making lead oxide comprising the steps of treating a hot concentrated aqueous lead chloride solution with alkali metal carbonate to precipitate lead carbonate, separating the precipitate from the solution, washing the precipitate to remove a portion of the reagent impurities, calcining the precipitate in a non-reducing atmosphere at a temperature between about 500° C. and 550° C. and thereby converting the mass into a spongy, unmelted lead oxide containing the reagent impurities as water soluble lead and sodium chlorides, thereafter washing the product thoroughly with water to remove said water soluble impurities and again calcining the material in a non-reducing atmosphere at a temperature below 900° C. and forming the desired product.

4. The method of making red lead in which the final washed product prepared according to claim 1 is thereafter calcined with air in excess at a temperature below 500° C. which serves to oxidize any PbO present to $Pb_3O_4$.

5. The method of making lead oxide from a lead bearing ore comprising the steps of converting a lead compound thereof to a lead salt of the group consisting of lead chloride and lead sulfate, dissolving the lead salt from the ore material by means of a hot, aqueous, concentrated alkali metal chloride solution and providing a lead sodium chloride brine which contains a high concentration of both lead and alkali metal ions, raising the temperature of the solution and maintaining it sufficiently high to insure that it is not saturated with respect to said ions, while treating said heated solution with alkali metal carbonate proportioned to precipitate the lead therefrom as a carbonate, separating the solution from the precipitate, calcining the precipitate in a non-reducing atmosphere at a temperature below 883° C. but above the decomposition point of the lead carbonate and forming a spongy, unmelted lead oxide containing the water soluble lead and sodium chlorides, and thereafter washing the product thoroughly with water to remove the reagent impurities from the lead oxide.

6. The method of making lead oxide from an ore material containing a lead compound of the group consisting of lead sulfate and lead chloride comprising the steps of leaching the ore material with a concentrated aqueous sodium chloride brine at a temperature in the vicinity of 75° C. and forming a lead sodium chloride brine of high concentration, raising the temperature of the solution to a point materially above the leaching temperature and holding it unsaturated with respect to its lead and sodium ions while treating it with a purification reagent capable of and proportioned for precipitating an impurity metal therefrom, removing the heated solution, and thereafter treating it with sodium carbonate proportioned to precipitate the lead as a carbonate, separating the precipitate from the solution, washing it with water, calcining it in a non-reducing atmosphere at a temperature below 883° C. but above the decomposition point of the lead carbonate and producing a spongy lead oxide containing water soluble impurities and subsequently washing out the impurities by means of water.

7. The method of making lead oxide from an ore material containing a lead compound of the group consisting of lead sulfate and lead chloride comprising the steps of leaching the ore material with a concentrated aqueous brine of alkali metal chloride at a temperature in the vicinity of 75° to 90° C. and thereby providing a brine which is substantially saturated with lead ions, raising the temperature of the solution and maintaining it sufficiently above the leaching temperature to insure that it is not saturated with respect to the lead and alkali metal ions, while treating the solution at such elevated temperature with alkali metal carbonate proportioned to precipitate the lead as a carbonate, separating the precipitate from the solution, calcining the precipitate in a non-reducing atmosphere at a temperature below 883° C. but above the decomposition point of the lead carbonate to form spongy lead oxide, thereafter washing the material with water to remove the water soluble salts, and again calcining it in a non-reducing atmosphere at a temperature below 900° C. to produce the desired lead oxide.

8. The method of making lead oxide from a complex lead and zinc sulfide ore comprising the steps of roasting the ore under oxidizing low temperature conditions, treating the roasted ore with an acid reagent capable of solubilizing the zinc compounds thereof and dissolving the same from the ore material as an aqueous zinc salt solution and leaving an ore residue free from water soluble zinc salts, leaching the ore residue with a hot, aqueous, concentrated alkali metal chloride solution at a temperature in the vicinity of 75 to 90° C., raising the temperature of the solution and maintaining it at a point which insures that the solution is not saturated with respect to either lead or alkali metal ions, while treating the solution at such elevated temperature with a purification reagent capable of and proportioned for precipitating an impurity metal therefrom, separating the precipitate from the heated solution and thereafter treating the solution with alkali metal carbonate proportioned to precipitate the lead as a carbonate, removing the solution from the precipitate and calcining the latter in a non-reducing atmosphere at a temperature below 883° C. but after the decomposition point of the lead carbonate and producing a spongy lead oxide, and subsequently washing out the water soluble impurities by means of water and thereafter again calcining the material in a non-reducing atmosphere at a temperature below 900° C. to produce the desired lead oxide.

THOMAS A. MITCHELL.
ROBERT J. DALTON.